US010658958B2

(12) United States Patent
Spyra et al.

(10) Patent No.: US 10,658,958 B2
(45) Date of Patent: May 19, 2020

(54) GENSET

(71) Applicant: INNIO Jenbacher GmbH & Co OG, Jenbach (AT)

(72) Inventors: Nikolaus Spyra, Innsbruck (AT); Lukas Vogl, Maurach (AT); Francisco Lopez, Innsbruck (AT)

(73) Assignee: Innio Jenbacher GMBH & CO OG, Jenbach (AT)

( * ) Notice: Subject to any disclaimer, the term of this patent is extended or adjusted under 35 U.S.C. 154(b) by 6 days.

(21) Appl. No.: 16/061,763

(22) PCT Filed: Dec. 22, 2016

(86) PCT No.: PCT/AT2016/060135
§ 371 (c)(1),
(2) Date: Jun. 13, 2018

(87) PCT Pub. No.: WO2017/112971
PCT Pub. Date: Jul. 6, 2017

(65) Prior Publication Data
US 2018/0367074 A1 Dec. 20, 2018

(30) Foreign Application Priority Data
Dec. 29, 2015 (AT) .................... 51106/2015

(51) Int. Cl.
*H02P 9/00* (2006.01)
*H02P 9/10* (2006.01)
(Continued)

(52) U.S. Cl.
CPC .............. *H02P 9/006* (2013.01); *F02D 29/06* (2013.01); *H02P 9/102* (2013.01); *H02P 9/107* (2013.01);
(Continued)

(58) Field of Classification Search
USPC .......................................... 322/21; 290/40 B
See application file for complete search history.

(56) References Cited

U.S. PATENT DOCUMENTS 4,009,427 A * 2/1977 Takahashi ............... H02P 23/08
318/700
6,670,721 B2 * 12/2003 Lof ......................... H02J 3/381
290/44
(Continued)

FOREIGN PATENT DOCUMENTS

EP   2 860 377 A2   4/2015
WO  2011/018549 A2  2/2011

OTHER PUBLICATIONS

Office Action issued in connection with corresponding AT Application No. A51106/2015 dated Dec. 23, 2016 (English Translation not available).

*Primary Examiner* — Pedro J Cuevas
(74) *Attorney, Agent, or Firm* — Fletcher Yoder, P.C.

(57) ABSTRACT

A genset including at least one generator for generating electrical energy, which can be driven by a drive device is provided. Also provided is a detection device for detection of the presence of a grid fault in at least one phase of the power grid, a device for determining an operating state of the generator immediately before or upon detection of a grid fault, and a regulating device, to which the signals of the detection device and the device for determining an operating state of the generator can be fed. The regulating device is designed upon detection of a grid fault to reduce the power of the drive device in dependence of that operating state of the generator, which has been determined immediately before or upon detection of the grid fault.

19 Claims, 3 Drawing Sheets

(51) Int. Cl.
  *H02P 9/04* (2006.01)
  *H02P 101/25* (2016.01)
  *F02D 29/06* (2006.01)
  *F01D 15/10* (2006.01)

(52) U.S. Cl.
  CPC ............. *F01D 15/10* (2013.01); *H02P 9/04* (2013.01); *H02P 2101/25* (2015.01)

(56) References Cited

U.S. PATENT DOCUMENTS

| | | | | |
|---|---|---|---|---|
| 6,812,586 B2 * | 11/2004 | Wacknov | ............... | H02P 9/04 290/40 B |
| 7,622,815 B2 * | 11/2009 | Rivas | ............... | H02P 9/102 290/44 |
| 8,559,197 B2 * | 10/2013 | Cullinane | ............... | H02P 9/02 363/37 |
| 8,587,160 B2 * | 11/2013 | Dai | ............... | H02M 5/4505 307/151 |
| 9,217,420 B2 * | 12/2015 | Parkhou | ............... | F03D 17/00 |
| 9,379,602 B2 * | 6/2016 | Zhu | ............... | H02H 7/06 |
| 9,850,807 B2 * | 12/2017 | Graus | ............... | F02B 19/10 |
| 10,352,301 B2 * | 7/2019 | Gupta | ............... | F03D 7/0284 |
| 2008/0157529 A1 * | 7/2008 | Rivas | ............... | H02P 9/007 290/44 |
| 2010/0182809 A1 * | 7/2010 | Cullinane | ............... | H02P 9/02 363/34 |
| 2011/0057444 A1 * | 3/2011 | Dai | ............... | H02J 3/386 290/44 |
| 2011/0316490 A1 * | 12/2011 | Lang | ............... | H02M 5/4505 322/21 |
| 2012/0175876 A1 | 7/2012 | Pendray et al. | | |
| 2013/0033268 A1 * | 2/2013 | Parkhou | ............... | F03D 9/255 324/511 |
| 2014/0301120 A1 * | 10/2014 | Zhu | ............... | H02H 7/06 363/49 |
| 2015/0109021 A1 * | 4/2015 | Gomez | ............... | G01R 31/40 324/764.01 |
| 2015/0115616 A1 * | 4/2015 | Gomez | ............... | F02D 41/021 290/40 B |
| 2017/0314534 A1 * | 11/2017 | Gupta | ............... | F03D 7/0284 |
| 2019/0257242 A1 * | 8/2019 | Thalhauser | ............... | F02B 37/16 |

* cited by examiner

GENSET

TECHNOLOGY FIELD

The disclosure relates to a genset with the characteristics of the preamble of claim 1 and a method for regulating a genset with the characteristics of the preamble of claim 10.

BACKGROUND

The term "genset" is generally understood as at least one arrangement of a generator driven by a drive device for generating electrical energy.

To do so, a mechanical power of the drive device, if necessary via a transmission unit, is input into the at least one generator, which in turn converts it into electrical power. This electrical power is hereinafter delivered to the power grid.

During a grid fault in a power grid, in particular during an electrical short circuit in at least one phase of the power grid, and the associated drop in grid voltage and increase of grid current in the power grid, unwanted changes of generator operating variables can occur in a generator, in particular in a synchronous generator, such as the rotational speed or the pole wheel displacement angle or load angle, because the drop of the grid voltage causes a significant reduction of the electrical power output from the generator to the power grid. In the case of conventional configurations in which a rotor of the generator is connected to a shaft of a drive device (for example, an internal combustion engine) which drives the rotor, this electrical power drop can cause a corresponding increase in the rotational speed of the drive device and thus of the rotor. As a result, the synchronization of the generator with the power grid can be lost or even a damage in the generator can be caused.

The so-called load angle is the angle at which the pole wheel of a synchronous machine rotates ahead (generator operation) or behind (motor operation) the synchronous rotary field.

The conventional approach to react to such grid faults is to take appropriate measures to counteract such an increase of the rotational speed and an associated increase in the load angle of the generator. Thus, measures are usually taken which reduce the rotational speed and the load angle. Such an exemplary measure is the reduction of the acceleration torque by correspondingly throttling a drive device connected to the generator.

Such methods for regulating a drive device are already known, for example, from AT 514 811 A1 and WO 2010/134994 A1. In the presence of a grid fault, an internal combustion engine (which functions as a drive device) is regulated here via the fuel supply or the ignition unit.

However, it has been shown that the conventional measures for a grid fault in certain situations are still associated with a greater change in the load angle.

BRIEF DESCRIPTION

The task of the embodiments of the present disclosure is to avoid the above-described disadvantages and to provide an improved genset in relation to the prior art and an improved method for operating a genset set during a grid fault (particularly in the initial phase of the grid fault) in the power grid. Therefore, it would be desirable to be able to react faster in the event of a grid fault in order to avoid a too high increase in the load angle.

This task is solved by a genset set having the characteristics of claim 1 and a method for regulating a genset with the characteristics of claim 10. Embodiments of the present disclosure are defined in the dependent claims.

The genset according to embodiments of the present disclosure comprises at least:
- one detection device for detecting the presence of a grid fault in at least one phase of a power grid,
- a device for determining an operating state of the generator immediately before or upon detection of a grid fault, and
- a regulating device to which the signals of the detection device and the device for determining the operating state can be fed.

The regulating device is designed to regulate the power of a drive device upon detection of a grid fault, in dependence of a specific operating state of the generator determined by the device for determining the operating state, which occurred immediately before or during the detection of the grid fault. This provides a better and faster reaction in the event of a grid fault for regulating the drive device because the load angle can be better controlled and a resulting deviation can be kept as small as possible. Thus a "ride through" of a grid fault (LVRT—low voltage ride through) is easier.

Such a genset can comprise a detection device, which comprises a measuring device for measuring of at least one grid voltage and/or a grid current of at least one phase of a power grid connected to the genset. In this case, the detection device detects the presence of a grid fault when measuring an undervoltage and/or an overcurrent in the at least one phase of the power grid. This undervoltage and this overcurrent refer to threshold values which can be determined by trials, measurements and experience values or physical models.

It can preferably be provided that the device for determining an operating state of the generator is designed as:
- a measuring device for measuring the voltage and/or the current of the generator and/or
- a measuring device for measuring the power of the generator and/or
- a measuring device for measuring the power factor of the generator.

It can preferably be provided that the regulating device upon reaching or passing predetermined threshold values for
- the power of the generator,
- the voltage and/or current of the power grid and
- of the power factor reduces the power of the drive device. Such threshold values can be determined by experience values, measurements or physical models.

It is known that the power of the generator and the voltages of the power grid drop in the presence of a grid fault and the current intensity increases. In order to obtain a characteristic signal for the output load angle, at least two of the above-mentioned measured variables are required.

It can preferably be provided that the regulating device is designed to reduce the power of the drive device by at least partially switching off or retarding an ignition device of at least one combustion chamber of the drive device and/or deactivating or reducing a fuel supply of at least one combustion chamber of the drive device. The switching off or retarding of the ignition device can be effected for individual, a plurality or all combustion chambers. For reciprocating piston engines this technique is known as "ignition skipping". The reduction or deactivation of the fuel supply can be effected for individual, a plurality or all combustion chambers.

It can preferably be provided that the regulating device is designed to reduce the power of the drive device for a predetermined period of time. It can preferably be provided that the regulating device is designed to carry out the predetermined period of time, during which the reduction in the power of the drive device is undertaken, in dependence on the operating state of the generator immediately before or upon detection of the grid fault and/or the configuration of the genset. The farther the last measured values concerning the operating state of the generator or the configuration of the genset immediately before or upon detection of the grid fault deviate from predetermined threshold values, the longer becomes the selected period of time. The regulating device can for this purpose comprise a lookup table, which comprises specific periods of time for various possible operating states of the generator and/or configurations of the genset immediately before or upon detection of the grid fault. A lookup table could, for example, be as follows:

| | | | | |
|---|---|---|---|---|
| Moment of inertia of the genset | um | um | um | um |
| Number of poles of the generator | um | um | um | um |
| Type of generator (e.g. full pole or salient pole) | S/S | S/S | S/S | S/S |
| Nominal power of the genset | um | um | um | um |
| Nominal voltage of the genset | um | um | um | um |
| Voltage of the power grid immediately before or at grid fault | um | um | um | um |
| Power of the generator immediately before or at grid fault | um | um | um | um |
| Power of the generator immediately before or at grid fault | um | um | um | um |
| Resulting predetermined period of time | um | um | um | um |

The values designated with "Num" (abbreviation for "numeric value") and "NS/S" (Abbreviation for "non-salient pole" or "slip pole") on the one hand refer to the configuration of the genset and on the other hand the measured values immediately before or at the occurrence of the grid fault. In each case a certain predetermined period of time results.

As an alternative to using a lookup table, a simple, e.g. linear, formula for different predetermined periods of time can also be saved for different configurations.

The predetermined periods of time can be e.g. in the range of 20 milliseconds to 60 milliseconds.

After expiry of the predetermined period of time, a renewed query of the measured values of the detection device and/or a determination of the operating state of the drive device can be made to determine what triggered a reduction in the power of the device, in order to decide on a further course of action. If the criteria still exist, which have triggered a reduction of the power of the drive device, the reduction of the power may be retained or, if necessary, intensified. If these triggers no longer exist, or only in a weakened condition, the regulating device can respond with a corresponding change. Depending on the legal regulations, a separation of the genset from the power grid may occur, if the grid fault takes too long.

It can preferably be provided that a device for calculating a current load angle of the generator is provided, whose signals can be fed to the regulating device, wherein the regulating device is designed to maintain the measures to reduce the power of the drive device upon reaching or exceeding a predetermined threshold value for the load angle and to terminate the measures to reduce the power of the drive device upon falling below the predetermined threshold value. In this case, depending on the operating state of the generator determined by the device for determining the operating state, the control device reduces the power of the drive device such that the load angle does not undergo too great a deviation.

It can preferably be provided that the drive device as preferably stationary internal combustion engine is preferably designed as a reciprocating piston engine or gas turbine. A reciprocating piston engine can be designed as a gas engine or dual fuel internal combustion engine.

BRIEF DESCRIPTION OF THE DRAWINGS

Various embodiments of the disclosure are shown in the following figures. The drawings in detail.

DETAILED DESCRIPTION

Figure 1:
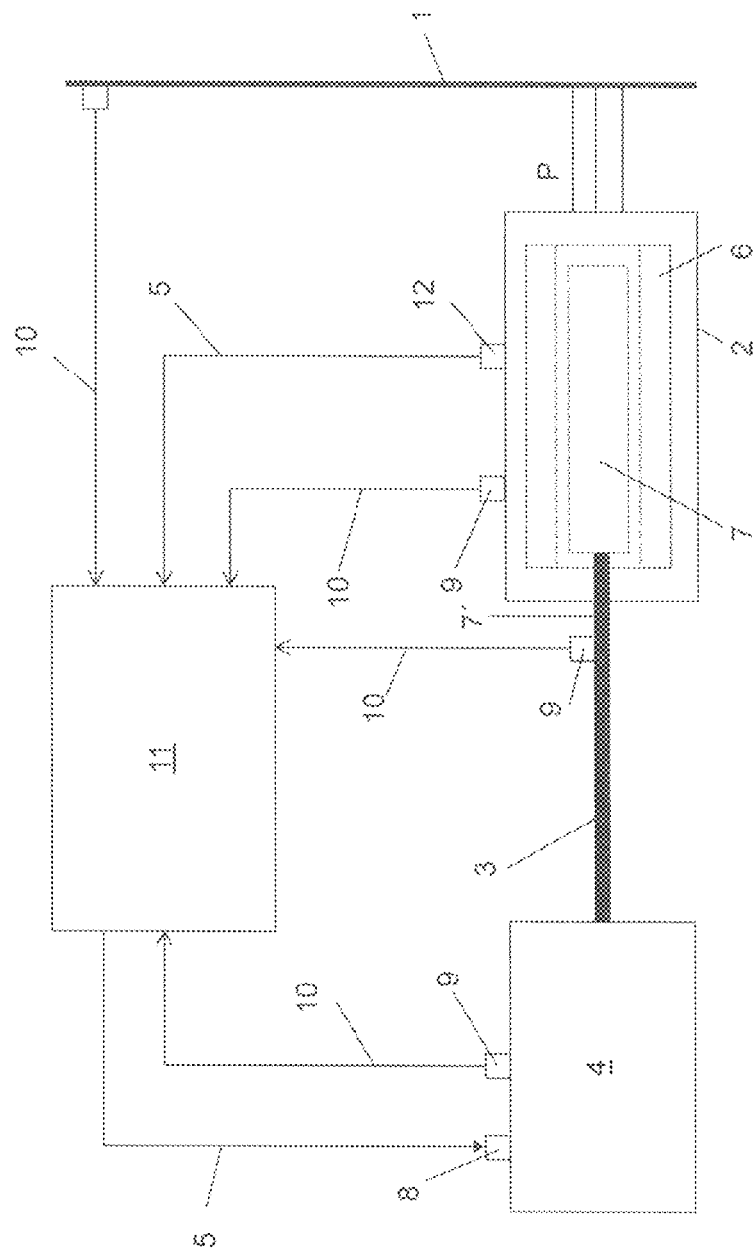
FIG. 1 shows a schematic block diagram of a generator, which is powered by a drive device that is electrically connected to a power grid

FIG. 1 shows a schematic block diagram of an electrical generator 2, which is electrically connected to a three-phase designed power grid 1. The generator 2 here is designed as a synchronous generator and comprises a stator 6 and rotatable rotor 7 within stator 6. The three phases of the power grid 1 are connected to windings on stator 6 of generator 2 in a known way. The power grid 1 can be a public power grid that determines the mains frequency, or, for example, a local power grid in stand-alone operation, where the grid frequency is determined by generator 2. The rotor 7 of generator 2 is connected via a transmission unit 3 (as is known from the prior art this can be designed, for example, as a motor shaft, a coupling or a rotor shaft 7') to a drive device here designed as an internal combustion engine 4.

The internal combustion engine 4 can be, for example, a stationary gas engine, designed as external ignition, Otto-engine powered reciprocating piston engine.

A mechanical power Pmech emitted by the internal combustion engine 4 is input in the generator 2 via the transmission unit 3, converted into (electric) power P in the generator 2, and subsequently, the electrical power P is delivered to power grid 1.

In the example shown, different measured values can be fed to regulating device 11 over sensors 9 by means of signal lines 10. These measured values can, for example, be the voltage U or the current I of the power grid 1, by which the sensor (which in this example is combined with the regulating device 11) can detect a grid fault. In addition, such measured variables from generator 2 can stem from the drive device or transmission unit 3 to determine a current operating state using the device for the determination of operating state (which in this concrete example is also combined with regulating device 11). The regulating device 11 can be designed here in such a way that it can determine a power factor with the present variables.

Furthermore, the regulating device 11 is connected over motor control lines 5 to an actuator unit 8, which is located at the internal combustion engine 4. This actuator unit 8 can regulate the power of the internal combustion engine 4. Such a regulation can occur, for example, via the regulation of the ignition and/or regulation of the quantity of fuel supplied. The regulating device 11 is also connected over motor control lines 5 to the actuator unit 12. This actuator unit 12 is located at generator 2 and can be designed, for example, to be able to disconnect generator 2 from the power grid 1, if this is necessary and/or permitted by law.

The internal combustion engine 4 can in particular be an air turbocharged gas engine.

Figure 2A:
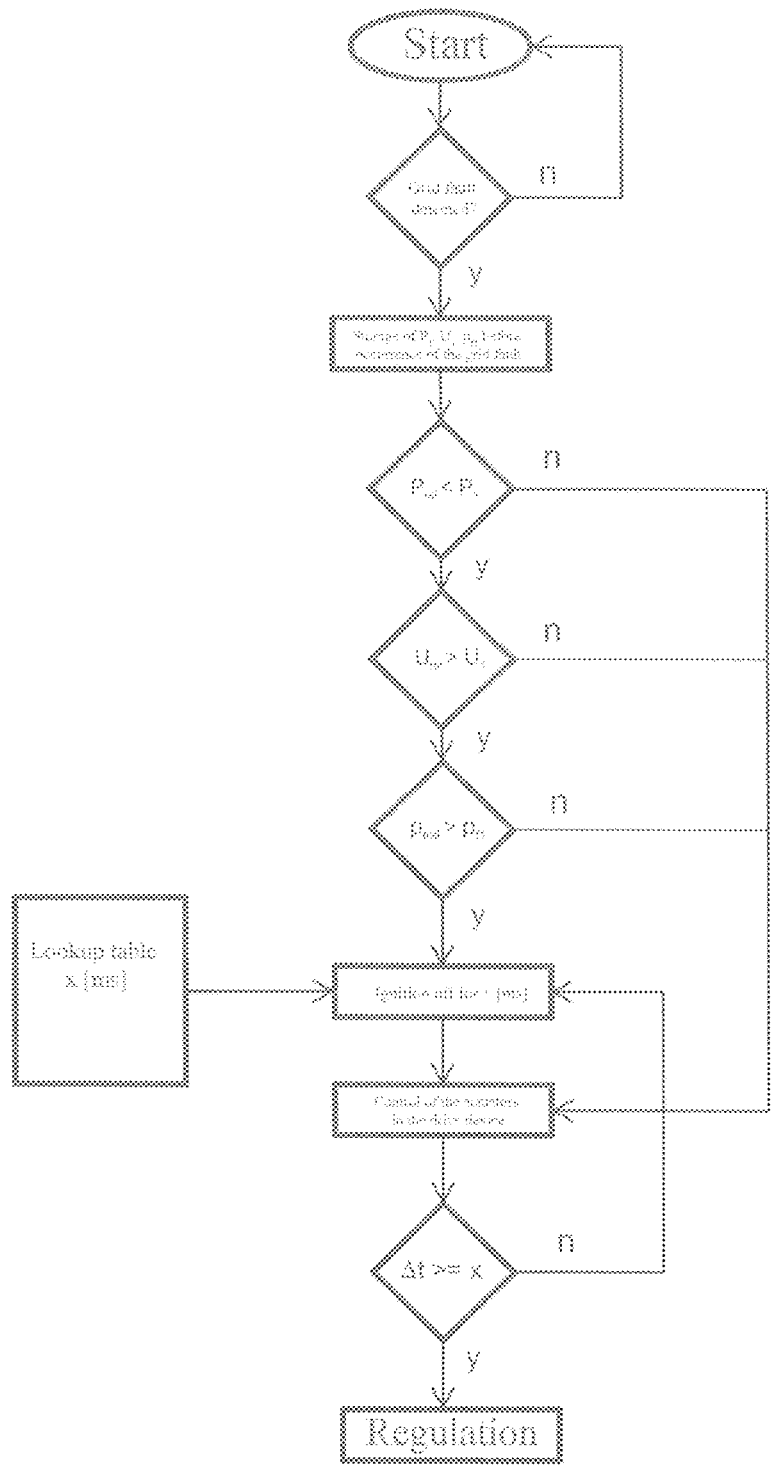
FIGS. 2a, 2b show block diagrams for a possible controlled path of a low voltage ride through (LVRT in short) regulation.
Figure 2B:
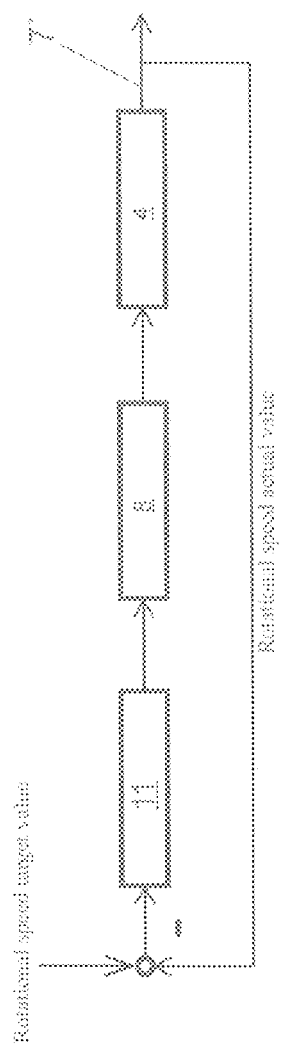

FIG. 2 shows a block diagram for a possible controlled path of a low voltage ride through (LVRT for short) regulation. This regulation starts with a grid monitoring by means of a detection device, which is continuously measuring the voltage U of the power grid 1 and upon detecting an undervoltage it concludes a grid fault. If such a grid fault is detected, then we perform the storage of a power Pi of the generator 2, a voltage $U_1$ of the power grid 1 and a power factor $p_{f1}$, which were measured just before or on the occurrence of the grid fault. If the values, which have occurred last, exceed or fall below the predetermined threshold values $P_{ref}$, $U_{ref}$, $P_{fref}$, therefore $P_{ref} < P_1$, $U_{ref} > U_1$, $p_{fref} > p_{f1}$, on the basis of the values which have occurred last, using a predefined table (lookup table), a predetermined period of time Δt will be decided upon in a regulating device 11 and through an appropriate control of actuators in the drive device, the power is reduced for the predetermined period of time Δt, e.g. the ignition for this period of time Δt is switched off. The reduction of the power can depending on the grid fault occur for the entire drive device or only for individual combustion chambers.

If these last occurring values do not exceed or fall below the threshold values, i.e. $P_{ref} > P_1$, $U_{ref} < U_1$, $p_{fref} < p_{f1}$, then the actuators in the drive device are controlled directly for a period of time Δt. In addition, the duration of this period of time Δt is determined, insofar as it is possible, from the amount of deviation of the last occurring values to the threshold values. (It may be the previously discussed period of time Δt.) At the end of this period of time Δt, a regulating cycle as known from the prior art is continued until the voltage U of the power grid 1 reaches a predetermined value.

Here, for example (see FIG. 2b), the current rotational speed value is measured and compared by the regulating device 11 to a predetermined desired rotational speed value (for example, 1500 rpm) of the rotor 7 or the rotor shaft 7'. With the calculated deviation (rotational speed delta value) of the current rotational speed to the desired rotational speed, the regulating device 11 generates a control/regulating signal for the appropriate control/regulation of the drive device by means of the actuator unit 12, e.g. via the ignition system. Depending on the speed deviation, this results e.g. in an ignition on/off. This loop can be repeated until the drive device has again reached the desired rotational speed for the stable normal operation and the regulating cycle for the low voltage ride through (LVRT for short) regulation ends.

If the voltage dip takes too long (e.g. in a range of 100 milliseconds to 300 milliseconds) and the voltage dip is too large (e.g. remaining residual voltage only between 0% and 30% of the voltage in the normal operation of the power grid), also a separation of the genset from the power grid can occur.

This written description uses examples in the disclosure, including the preferred embodiments, and to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What we claim is:

1. A genset with at least one generator for generating electrical energy, driven by a drive device, comprising:
   a detection device for detecting a presence of a grid fault in at least one phase of a power grid;
   a device for determining an operating state of the at least one generator immediately before or upon detection of the grid fault;
   a regulating device to which signals from the detection device and the device for determining the operating state can be fed, wherein the regulating device is designed to regulate power of the drive device upon detection of the grid fault, in dependence on a specific operating state of the at least one generator determined by the device for determining the operating state, which occurred immediately before or during detection of the grid fault; and
   a load angle device for calculating a current load angle of the at least one generator, whose signals can be fed to the regulating device, wherein the regulating device is designed to maintain and reinforce measures to reduce power of the drive device upon reaching or exceeding a predetermined threshold value by using a Moment of inertia of the genset and the load angle and to terminate or reduce measures to reduce power of the drive device upon falling below the predetermined threshold value.

2. The genset according to claim 1, wherein the detection device comprises a measuring device for measuring at least one grid voltage and/or a grid current of the at least one phase of the power grid connected to the genset, wherein the detection device reports the presence of the grid fault when measuring an undervoltage and/or an overcurrent in the at least one phase of the power grid.

3. The genset according to claim 1, wherein the device for determining the operating state of the generator comprises:
   a measuring device for measuring a voltage and/or a current of the at least one generator; and/or
   a measuring device for measuring the power of the at least one generator; and/or
   a measuring device for measuring a power factor of the at least one generator.

4. The genset according to claim 3, wherein the regulating device upon reaching or passing predetermined threshold values for
   the power of the at least one generator,
   the voltage and/or current of the power grid, and
   the power factor,
   reduces the power of the drive device.

5. The genset according to claim 1, wherein the regulating device is designed to reduce power of the drive device by an at least partial switch off or retarding of an ignition device of at least one combustion chamber, and/or deactivating or reducing a fuel supply of the at least one combustion chamber of the drive device.

6. The genset according to claim 1, wherein the regulating device is designed to reduce power of the drive device for a predetermined period of time.

7. The genset according to claim 6, wherein the regulating device is designed to reduce for the predetermined period of time the power of the drive device, in dependence of the operating state of the at least one generator immediately before or upon detection of the grid fault.

8. The genset according to claim 1, wherein the drive device is an internal combustion engine, a reciprocating piston engine, or a gas turbine.

9. A method for regulating a genset comprising at least one generator for generating electrical energy, driven by a drive device, the method comprising:
- detecting a presence of a grid fault in at least one phase of a power grid;
- determining an operating state of the at least one generator immediately before or upon detection of the grid fault; and
- upon detection or presence of the grid fault, regulating a power of the drive device based on a specific operating state of the at least one generator which occurred immediately before or on detection of the grid fault, wherein regulating the power comprises using a load angle device for calculating a current load angle of the at least one generator, whose signals can be fed to a regulating device, wherein the regulating device is designed to maintain and reinforce measures to reduce power of the drive device upon reaching or exceeding a predetermined threshold value by using a Moment of inertia of the genset and the load angle and to terminate or reduce measures to reduce power of the drive device upon falling below the predetermined threshold value.

10. The method of claim 9, wherein detecting the presence of the grid fault comprises using a detection device comprising a measuring device for measuring at least one grid voltage and/or a grid current of the at least one phase of the power grid connected to the genset, wherein the detection device reports the presence of the grid fault when measuring an undervoltage and/or an overcurrent in the at least one phase of the power grid.

11. The method of claim 9, wherein determining the operating state of the at least one generator comprises using a device that comprises:
- a measuring device for measuring a voltage and/or a current of the at least one generator; and/or
- a measuring device for measuring the power of the at least one generator; and/or
- a measuring device for measuring a power factor of the at least one generator.

12. The method of claim 10, wherein regulating the power of the drive device comprises using the regulating device upon reaching or passing predetermined threshold values for:
- the power of the at least one generator,
- the voltage and/or current of the power grid, and
- the power factor,
- and reducing, via the regulating device, the power of the drive device.

13. The method of claim 12, wherein the regulating device is designed to reduce power of the drive device by
- an at least partial switch off or retarding of an ignition device of at least one combustion chamber, and/or
- deactivating or reducing a fuel supply of the at least one combustion chamber of the drive device.

14. The method of claim 12, wherein the regulating device is designed to reduce for the predetermined period of time the power of the drive device, in dependence of the operating state of the at least one generator immediately before or upon detection of the grid fault.

15. A system, comprising:
- a detection device for detecting a presence of a grid fault in at least one phase of a power grid, wherein the power grid is powered via a genset with at least one generator for generating electrical energy, driven by a drive device;
- a device for determining an operating state of the at least one generator immediately before or upon detection of the grid fault;
- a regulating device to which signals from the detection device and the device for determining the operating state can be fed, wherein the regulating device is designed to regulate power of the drive device upon detection of the grid fault, in dependence on a specific operating state of the at least one generator determined by the device for determining the operating state, which occurred immediately before or during detection of the grid fault; and
- a load angle device for calculating a current load angle of the at least one generator, whose signals can be fed to the regulating device, wherein the regulating device is designed to maintain and reinforce measures to reduce power of the drive device upon reaching or exceeding a predetermined threshold value by using a Moment of inertia of the genset and the load angle and to terminate or reduce measures to reduce power of the drive device upon falling below the predetermined threshold value.

16. The system of claim 15, wherein the detection device comprises a measuring device for measuring at least one grid voltage and/or a grid current of the at least one phase of the power grid connected to the genset, wherein the detection device reports the presence of the grid fault when measuring an undervoltage and/or an overcurrent in the at least one phase of the power grid.

17. The system of claim 15, wherein the device for determining the operating state of the generator comprises:
- a measuring device for measuring a voltage and/or a current of the at least one generator; and/or
- a measuring device for measuring the power of the at least one generator; and/or
- a measuring device for measuring a power factor of the at least one generator.

18. The system of claim 15, wherein the regulating device upon reaching or passing predetermined threshold values for
- the power of the at least one generator,
- the voltage and/or current of the power grid, and
- the power factor,
- reduces the power of the drive device.

19. The system of claim 15, wherein the regulating device is designed to reduce power of the drive device by
- an at least partial switch off or retarding of an ignition device of at least one combustion chamber, and/or
- deactivating or reducing a fuel supply of the at least one combustion chamber of the drive device.

\* \* \* \* \*